US009075288B2

(12) United States Patent
McBride et al.

(10) Patent No.: US 9,075,288 B2
(45) Date of Patent: Jul. 7, 2015

(54) PAN, TILT, ZOOM CAMERA SYSTEM FOR COOLING ELECTRONICS

(71) Applicant: Sensormatic Electronics, LLC, Boca Raton, FL (US)

(72) Inventors: Frederick Michael McBride, Belfast (GB); David McKee, Lisburn (GB)

(73) Assignee: Sensormatic Electronics, LLC, Boca Raton, FL (US)

( * ) Notice: Subject to any disclaimer, the term of this patent is extended or adjusted under 35 U.S.C. 154(b) by 97 days.

(21) Appl. No.: 14/018,905

(22) Filed: Sep. 5, 2013

(65) Prior Publication Data

US 2014/0063334 A1 Mar. 6, 2014

Related U.S. Application Data

(60) Provisional application No. 61/697,709, filed on Sep. 6, 2012.

(51) Int. Cl.
*G03B 17/55* (2006.01)
*H04N 5/225* (2006.01)

(52) U.S. Cl.
CPC ............. *G03B 17/55* (2013.01); *H04N 5/2252* (2013.01)

(58) Field of Classification Search
CPC ..... H04N 5/2252; H04N 5/2253; H04N 7/18; G03B 17/55; G03B 13/19619; G03B 13/1963
See application file for complete search history.

(56) References Cited

U.S. PATENT DOCUMENTS

| | | | | |
|---|---|---|---|---|
| 6,061,087 A | * | 5/2000 | Schieltz et al. | 348/151 |
| 7,362,372 B2 | * | 4/2008 | Lyon et al. | 348/373 |
| 7,540,670 B2 | * | 6/2009 | Hida | 396/427 |
| 8,511,915 B2 | * | 8/2013 | Lee | 396/427 |
| 2005/0094994 A1 | | 5/2005 | Paolantonio et al. | |
| 2006/0055819 A1 | * | 3/2006 | Pokrovsky et al. | 348/373 |

FOREIGN PATENT DOCUMENTS

EP 1748640 A1 1/2007

OTHER PUBLICATIONS

International Search Report and Written Opinion of the International Searching Authority mailed Dec. 16, 2013, from counterpart International Application No. PCT/US2013/058167.
International Preliminary Report on Patentability, date of issuance Mar. 10, 2015, from counterpart International Application No. PCT/US2013/058167.

* cited by examiner

*Primary Examiner* — Luong T Nguyen
(74) *Attorney, Agent, or Firm* — Houston & Associates, LLP

(57) ABSTRACT

A pan tilt zoom (PTZ) camera system implements a disc valve system to enhance the cooling of electronics. The disc valve system includes a static camera base and a rotating camera pan bearing. The static camera base has static base vent slots arranged along the perimeter of the static camera base. The rotating camera pan bearing includes at least one pan bearing vent slot that aligns with the static base vent slots. During rotation of the rotating camera pan bearing, the at least one pan bearing vent slot aligns with the static base vent slots enabling movement of air over electronics of the (PTZ) camera system.

20 Claims, 7 Drawing Sheets

PAN, TILT, ZOOM CAMERA SYSTEM FOR COOLING ELECTRONICS

RELATED APPLICATIONS

This application claims the benefit under 35 U.S.C. §119 (e) of U.S. Provisional Application No. 61/697,709, filed on Sep. 6, 2012, which is incorporated herein by reference in its entirety.

BACKGROUND OF THE INVENTION

Video surveillance cameras are often used for monitoring areas inside or outside buildings. Examples of monitored areas include parking lots, casinos, hospitals, or government buildings. These video surveillance cameras capture video images and other data from the monitored areas and typically send those video images to a control system and/or network video recorder (NVR).

One type of video surveillance camera is a pan, tilt, zoom (PTZ) camera system. A PTZ camera system rotates or pans a camera about a vertical axis and also changes the direction of or tilts the camera to capture different scenes within the monitored areas. Some PTZ camera systems are programmed to automatically pan and tilt the cameras based on pre-set viewing selections or patterns or automatically based on computer image analysis of the video images.

Typically, a PTZ camera system includes a camera base that is attached to the ceiling or to an arm for connection to the wall of a building. The PTZ camera system also includes a rotating camera pan bearing for enabling the camera to pan in different directions. The PTZ camera system also includes an electronics board for controlling the camera. Electronics on the electronics board generate a significant amount of heat during operation. These electronics are typically cooled with heat sinks and/or fans.

SUMMARY OF THE INVENTION

Although the electronics board is cooled by the heat sink and fan, heat generated by the electronics of the board can still be significant enough to damage the PTZ camera system or reduce its operational lifetime. Due to this problem, there is a need to improve the cooling of the PTZ camera system to more efficiently lower the temperature of the PTZ camera system, more particularly heat sink and electronics board.

The present system provides a cooling solution having an integrated arrangement of air flow. Specifically, the present system pertains to the dynamic management of air flow over critical elements such as heat sinks, electronics boards, a camera, and/or a motor, to list a few examples. The system utilizes a disc valve system to direct air across the critical elements and dissipate heat to prevent damage.

In general, according to one aspect, the invention features a camera system for cooling electronics including a camera base that has base vent slots arranged along a perimeter of the camera base. The system further includes a rotating camera pan bearing attached over the camera base, wherein the rotating camera pan bearing includes at least one pan bearing vent slot that aligns with different ones of the base vent slots during rotation relative to the camera base.

In embodiments, the camera system comprises a heat sink and an electronics board attached to the rotating camera pan bearing. The heat sink and electronics board are positioned adjacent to the at least one pan bearing vent slot. As a result, alignment of the at least one pan bearing vent slot with the base vent slots ensures air flow is directed over the heat sink and the electronics board.

In a current implementation, a tilt, zoom camera is attached to the rotating camera pan bearing, and a fan is provided to move air through the at least one pan bearing vent slot and base vent slots. A fan housing is attached to the camera base and protects the fan and enables the fan to exhaust the air out fan vent slots of the fan housing.

Further, the base vent slots are currently spaced along the perimeter such that the at least one pan bearing vent slot is always at least partially aligned with at least one base vent slot to maintain air flow within the camera system.

In general, according to another aspect, the invention features a method for cooling electronics of a pan tilt zoom camera system. The method includes providing a camera base including base vent slots arranged around a perimeter of the camera base. The method further includes rotating a rotating camera pan bearing over the camera base, wherein the rotating camera pan bearing includes at least one pan bearing vent slot that aligns with the base vent slots during rotation.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same or similar parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms of the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

The present system improves cooling by a disc valve system. The disc valve system facilitates the control of the air flow through a PTZ camera system 100.

In general, the PTZ camera system 100 uses the disc valve system to direct air flow over the hottest areas of the system 100. The hot areas typically include a heat sink 102 and/or electronics board 104. In another example, the hot area is the electronics board 104 and camera 118, when no heat sink is used.

Figure 1:
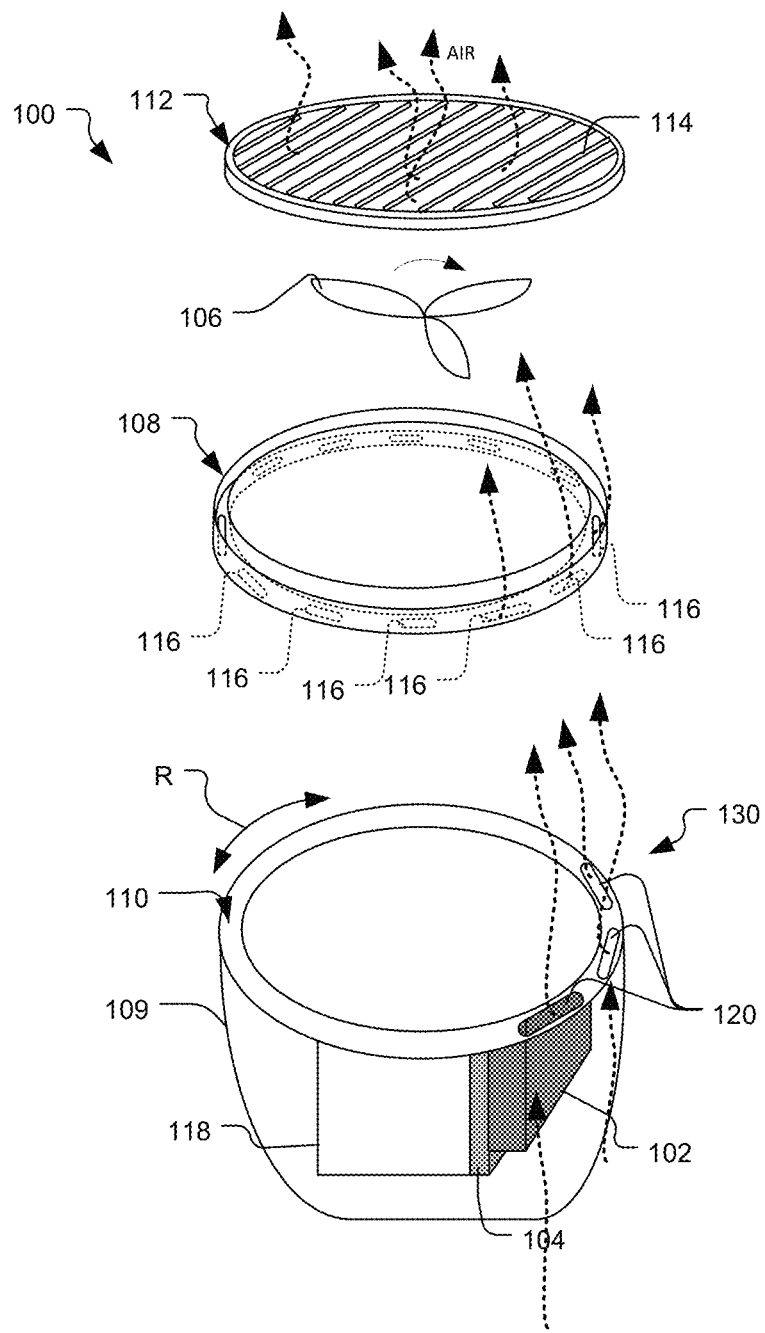
FIG. 1 is an exploded schematic view of a PTZ camera system according to the present invention.

FIG. 1 is an exploded schematic view of a PTZ camera system 100 that implements a disc valve system 130 for cooling an electronics board 104 and a heat sink 102. For illustrative purposes, the PTZ camera system 100 has been simplified.

The PTZ system 100 includes three main parts: a fan 106, a static camera base 108, and a rotating camera pan bearing 110 on which the camera 118 is mounted.

The fan 106 is housed within a fan housing 112, which protects the fan 106 and includes fan housing vents 114. The vents 114 enable air to be exhausted out of the fan housing 112. In a typical implementation, the fan 106 is the primary source of air movement for the PTZ camera system 100. However, in other embodiments, the air flow is passive, convective air movement.

The combination of the static camera base 108 and the rotating camera pan bearing 110 forms the disc valve system 130. The disc valve system 130 enables the rotating camera pan bearing 110 to rotate (or pan) while the static camera base 108 remains in a static (or fixed) position. In a typical implementation, the rotating camera pan bearing 110 is rotated by a motor.

Static base vent slots 116 are arranged around the perimeter of the static camera base 108. This series of slots 116 along with the static camera base 108 are fixed in position. Similarly, the rotating camera pan bearing 110 includes pan bearing vent slots 120 that rotate as the camera pan bearing 110 rotates.

The static base vent slots are spaced along the perimeter such that at least one pan bearing vent slot is always at least partially aligned with at least one base vent slot regardless of which direction the rotating camera pan bearing 110 is pointing. This ensures that an air flow is always maintained within the PTZ camera system 100.

In operation, the camera pan bearing 110 rotates during a pan operation. As the pan bearing rotates, the pan bearing vent slots 120 rotate. This rotation causes the pan bearing vent slots 120 to at least partially align with different static base vent slots 116. This interaction of the pan bearing vent slots 120 with the static base vent slots 116 is the core of the disc valve system 130. Were the pan bearing vent slots 120 and the static base vent slots 116 are aligned, air is able to move up through the unblocked vent slots. The air is then exhausted from the fan housing 112 by the fan 106. This causes air to be pulled up through the unblocked pan bearing vent slots 120 and static base vent slots 116 in a way the concentrates air movement over the heat-generating components.

The camera 118 is attached to the rotating camera pan bearing 110. Typically, the camera 118 is a video surveillance camera that generates video image data that is sent from the camera via a security system data network. More specifically, the camera 118 is generally a tilt type camera that pivots around a tilt axis. In a typical implementation, the camera is protected from weather conditions, vandalism, and tampering by a camera housing 109.

The electronics board 104 is attached to the camera 118 and includes circuits for controlling and powering the camera 118 and motor (not shown).

In an alternative embodiment, there is no heat sink attached to the back of the electronics board 104. In this embodiment, the electronics board is cooled only by air flow from the fan 106.

The disc valve system 130 is able to enhance the ducting of air over the heat generating electronics because the air flow is directed through the unblocked static base vent slots 116 and pan bearing vent slots 120. This ensures that the PTZ system 100 maintains maximum air flow over critical elements by ducting the air from the hottest area of the PTZ system 100 and also minimizes excess air flow or "leakage" in areas where it would not contribute to cooling.

Figure 2:
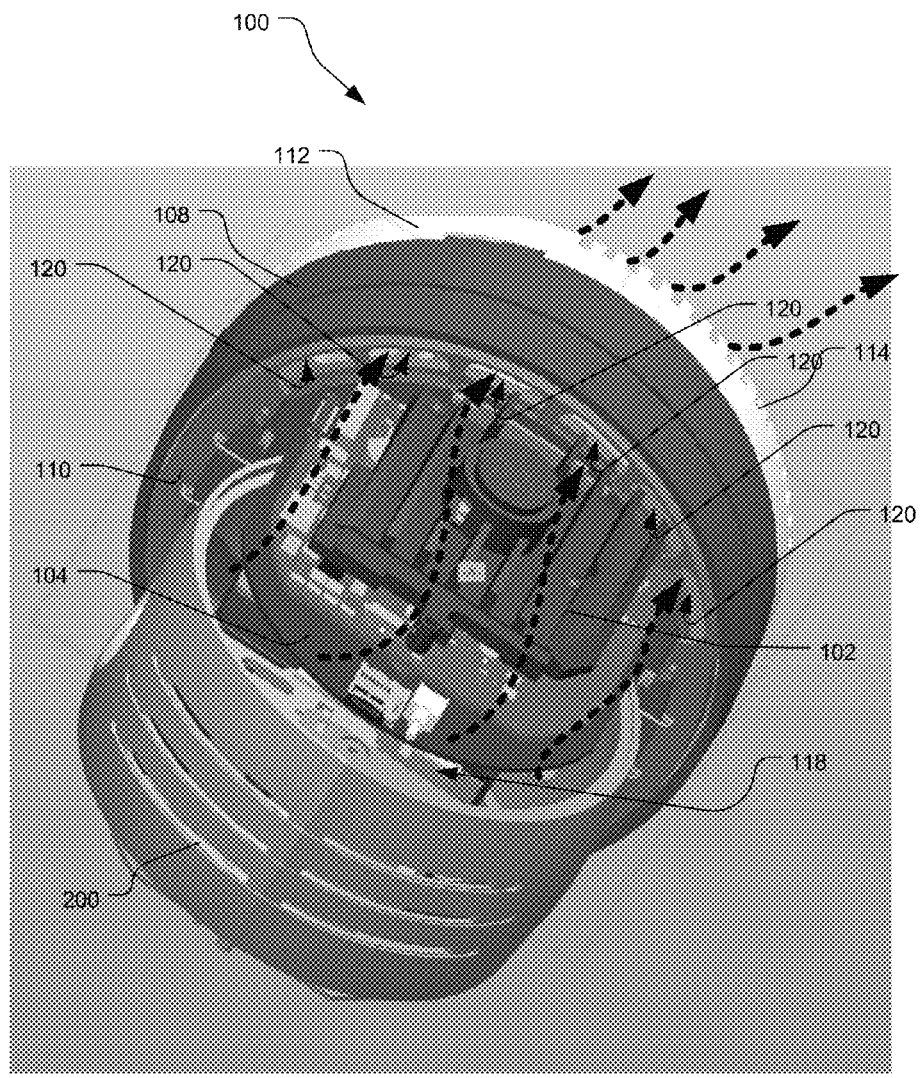
FIG. 2 is a perspective (bottom) view of a PTZ camera system showing an embodiment of the present invention.

FIG. 2 is a perspective (bottom) view that illustrates an embodiment of the PTZ camera system 100.

The illustrated embodiment shows how the heat sink 102 and electronics board 104 are mounted adjacent to the pan bearing vent slots 120. These pan bearing vent slots 120 enable air (shown as arrows with dotted lines) to be drawn over the heat sink 102 and electronics board 104.

In more detail, the air is drawn in through camera vents 200 that allow air to be drawn into the camera 118, then across heat sink 102 and electronics board 104 (camera block), through the disk valve slots, and into the static camera base 108. The air is finally exhausted out of the fan housing 112 to remove heat generated during the operation of the camera 118.

Figure 3:
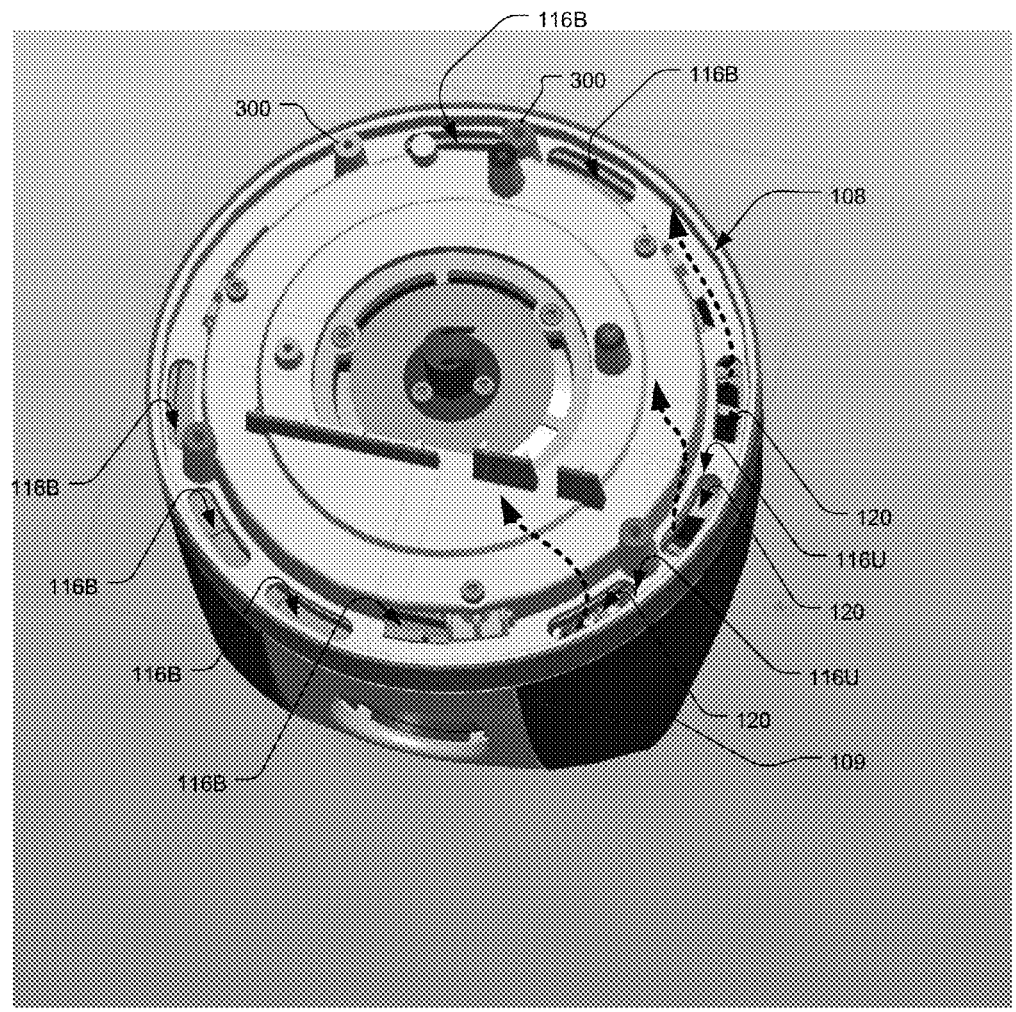
FIG. 3 is a perspective (top) view of the PTZ camera system in FIG. 2 without the fan housing according to the embodiment of the present invention.

FIG. 3 is a perspective (top) view that illustrates the static camera base 108 and static base vents slots 116. In the illustrated example, the fan housing and fan are removed to better illustrate the static base vent slots 116 and pan bearing vent slots 120.

As illustrated, only some of the static base vent slots 116 are aligned with the pan bearing vent slots 120. The blocked static base vents slots 116B cause the air to be directed up through the unblocked static base vents slots 116U. This helps maintain maximum air flow over critical components and reduce leakage of airflow within the PTZ camera system 100.

A number of static base bosses 300 are arranged on the static camera base 108. The static base bosses 300 provide attachment points for the fan, fan housing 112 and to mount the camera system 100 at an installation location. The fan housing 112 has fittings or other components that fasten into these static base bosses 300 during assembly and attachment of the fan housing 112 to the static camera base 108.

Figure 4:
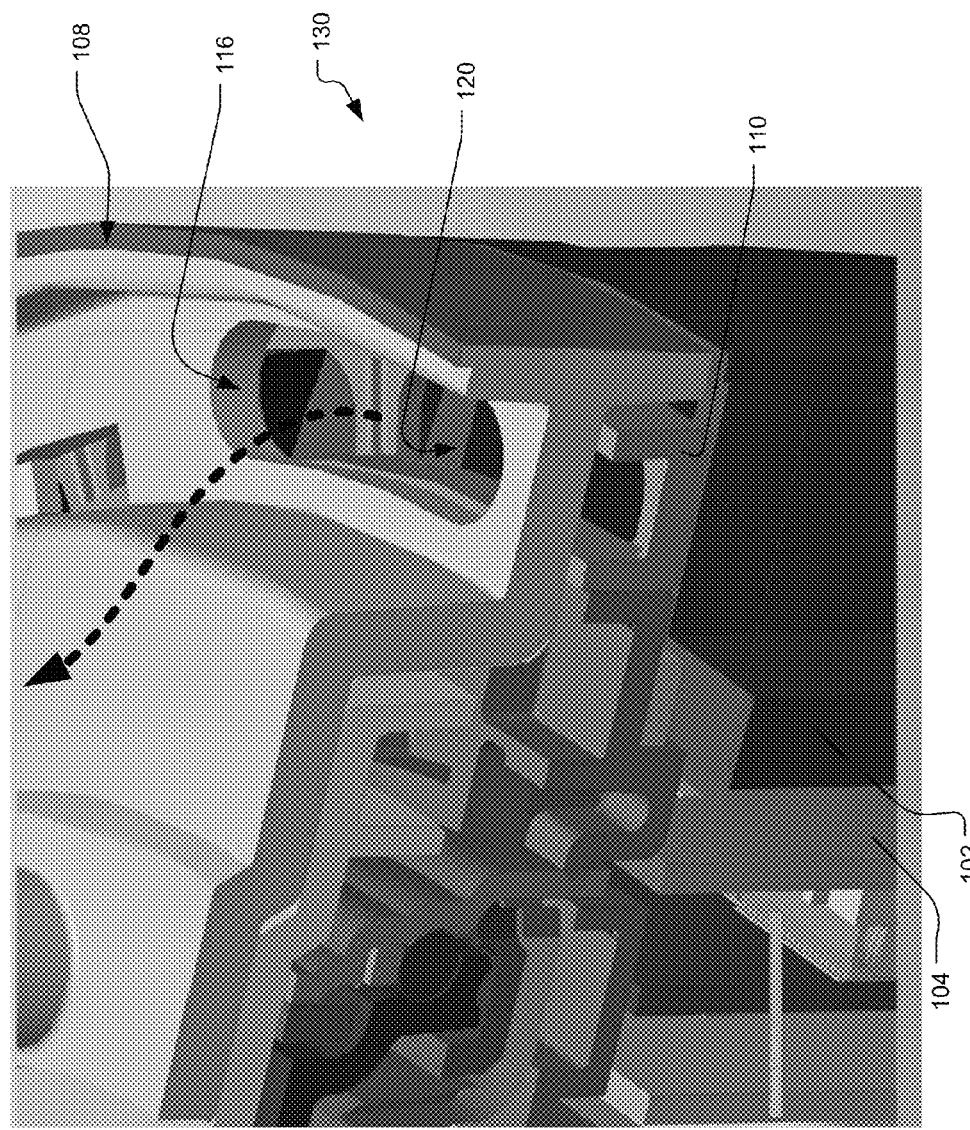
FIG. 4 is a close-up, cross-sectional (perspective) view of a section of the PTZ camera system from FIG. 2 according to the embodiment of the present invention.

FIG. 4 is a perspective view that illustrates a close-up view of the static camera base 108 and the camera pan bearing 110. This view illustrates how the static base vent slots 116 of the base 108 are aligned with the pan bearing vent slots 120 of the pan bearing 110. The alignment of these slots enables air to flow over the heat sink 102 and electronics board 104 of the PTZ camera system 100.

Figure 5:
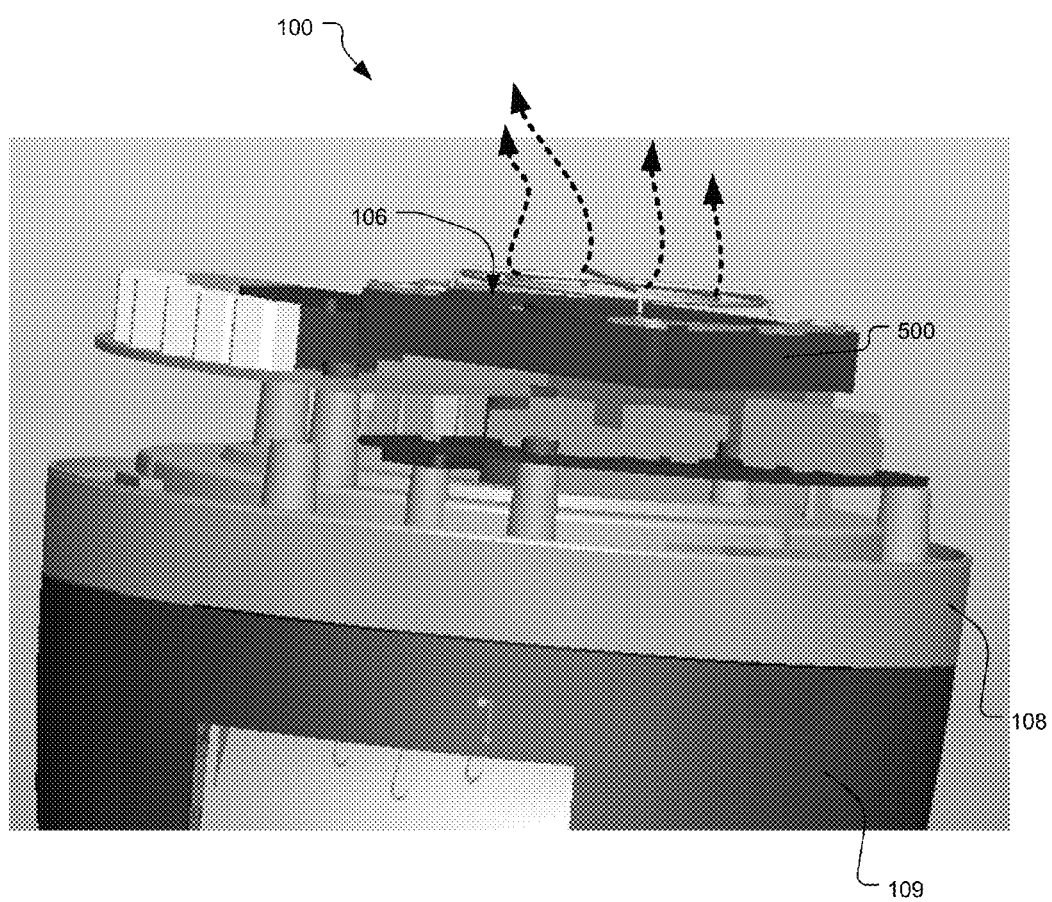
FIG. 5 is a close-up, side view (perspective) of the PTZ camera system in FIG. 2 without the fan housing according to the embodiment of the present invention.

FIG. 5 is a perspective view that illustrates a side view of the PTZ camera system 100. In the illustrated example, the fan housing is removed to show the fan 106 installed into and over the static camera base 108. The fan 106 is positioned on a board 500 that is raised about 2 millimeters above the static camera base 108.

Figure 6A:
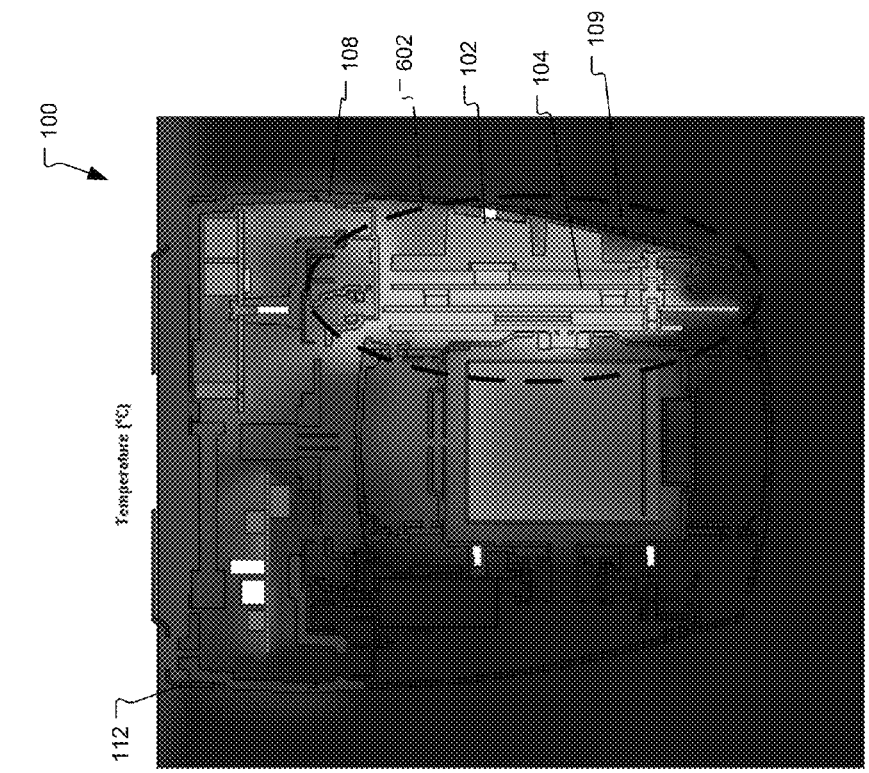
FIG. 6A is a simulated thermal image of the PTZ camera system that illustrates temperatures within the PTZ camera system when the disc valve cooling system is not implemented.

FIG. 6A is a simulated thermal image of the PTZ camera system 100 that illustrates temperatures within the PTZ camera system 100 when the disc valve system is not implemented.

A hot area 602 exhibits high temperatures within the PTZ camera system 100. This hot area 602 is caused by the heat being generated by the electronics board 104, which is inefficiently dissipated.

Figure 6B:
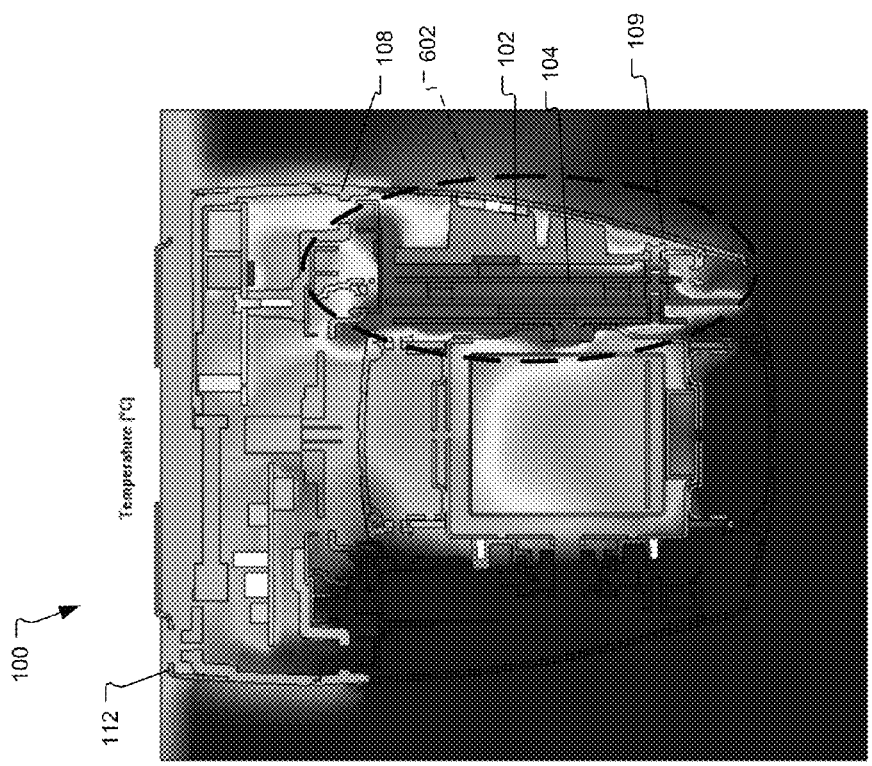
FIG. 6B is a simulated thermal image of the PTZ camera system that illustrates temperatures within the PTZ camera system that implements the disc valve cooling system according to the embodiment of the present invention.

FIG. 6B is a simulated thermal image of the PTZ camera system 100. This figure illustrates the temperatures within the PTZ camera system 100 when the disc valve cooling system 130 is implemented. When the he disc valve cooling system 130 is implemented, the hot area 602 is cooler compared to when the disc valve system is not implemented.

Figure 7:
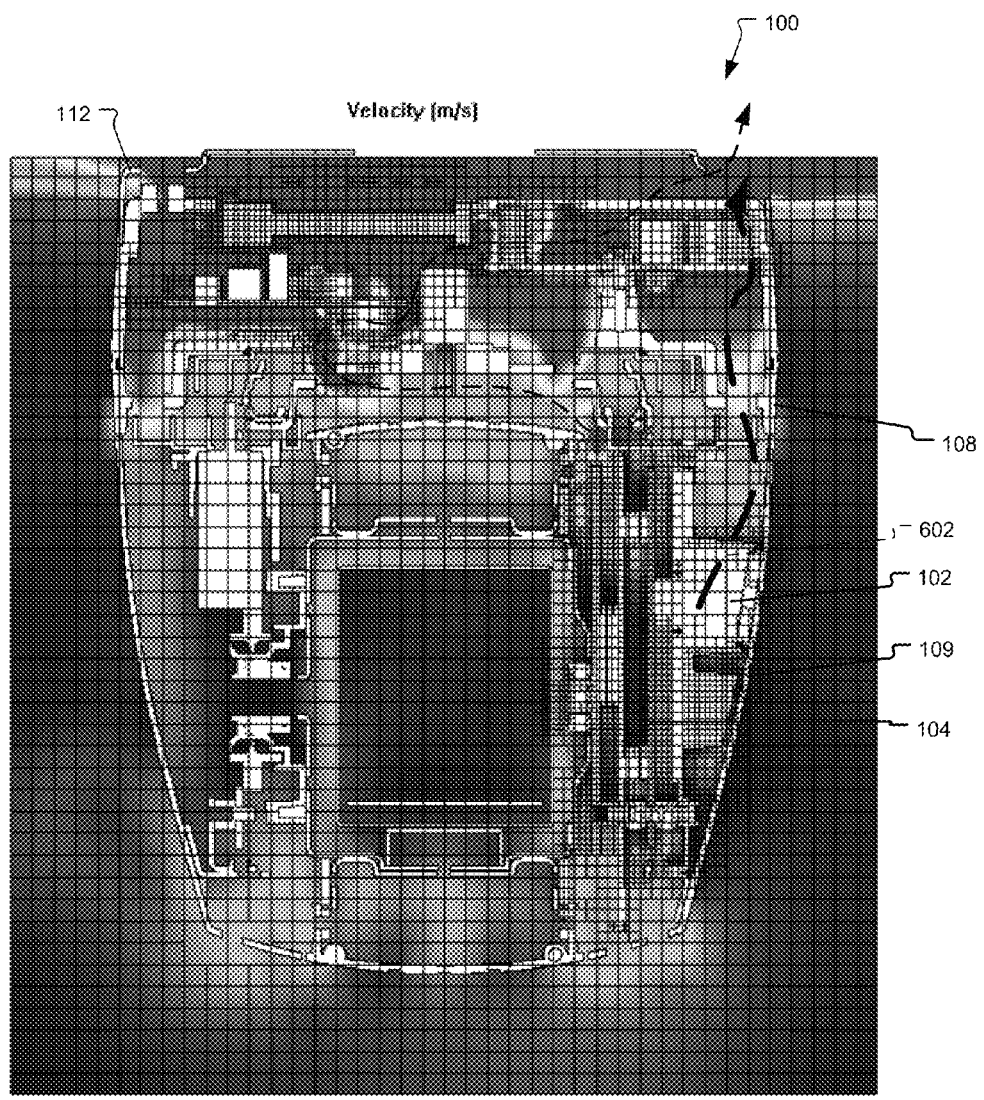
FIG. 7 is a cross-sectional view illustrating air velocity within the PTZ camera system.

FIG. 7 is a cross-sectional view illustrating air velocity through the PTZ camera system 100. The air (shown as arrows with dotted lines) is directed through the PTZ camera system 100 to cool components such as the heat sink 102 and electronics board 104 that are within the camera housing 109. The dashed arrows show the paths the air travels through the PTZ camera system 100.

In one implementation, the disc valve system 130 may further include vents or slots within the center of the disc valve system 130. These center vents may be partially blocked by a polyester film disc, which improves the efficiency of the air flow through the disc valve system 130. By restricting air flow through the center of the system, a proportional air flow is created over the components under the heat sink on the side of the disc valve system 130 and over the camera 118 in the center of the disc valve system 130. Additionally, this proportional air flow is maintained during the pan or tilt functions of the camera pan bearing 110 and camera 118.

In a current embodiment, the polyester film disc is a separate component that is attached to the static camera base 108. Additionally, the size of the polyester film disc may be adjustable to control the amount of air able to move through the center vents. Alternatively, the polyester film disc may completely block the center vents to prevent any air from moving through the center vents. The use of this separate disc provides flexibility in controlling operation at the assembly step.

In an alternative embodiment, the static camera base 108 and/or camera pan bearing 110 are fabricated to remove or reduce any center vents.

While this invention has been particularly shown and described with references to preferred embodiments thereof, it will be understood by those skilled in the art that various changes in form and details may be made therein without departing from the scope of the invention encompassed by the appended claims.

What is claimed is:

1. A camera system, comprising:
   a camera base including base vent slots arranged along a perimeter of the camera base; and
   a rotating camera pan bearing attached over the camera base, wherein the rotating camera pan bearing includes at least one pan bearing vent slot that aligns with different ones of the base vent slots during rotation relative to the camera base.

2. The camera system as claimed in claim 1, further comprising a heat sink and an electronics board attached to the rotating camera pan bearing, wherein the heat sink and electronics board are positioned adjacent to the at least one pan bearing vent slot.

3. The camera system as claimed in claim 2, wherein alignment of the at least one pan bearing vent slot with the base vent slots ensures air flow is directed over the heat sink and the electronics board.

4. The camera system as claimed in claim 1, further comprising a camera attached to the rotating camera pan bearing.

5. The camera system as claimed in claim 4, wherein the camera is tilt, zoom camera.

6. The camera system as claimed in claim 1, further comprising a fan to move air through the at least one pan bearing vent slot and base vent slots.

7. The camera system of claim 6, further comprising a fan housing that is attached to the camera base, the fan housing protecting the fan and enabling the fan to exhaust the air out fan vent slots of the fan housing.

8. The camera system as claimed in claim 1, wherein the base vent slots are spaced along the perimeter such that the at least one pan bearing vent slot is always at least partially aligned with at least one base vent slot to maintain air flow within the camera system.

9. The camera system as claimed in claim 1, wherein the rotating camera pan bearing is rotated via a motor, which is cooled from air moving through the at least one pan bearing vent slot and the base vent slots.

10. The camera system as claimed in claim 1, wherein the base vent slots that are not aligned with the at least one pan bearing vent slot prevent air from moving between the camera base and a camera housing.

11. A method for cooling electronics of a camera system, comprising:
    providing a camera base including base vent slots arranged around a perimeter of the camera base; and
    rotating a rotating camera pan bearing over the camera base, wherein the rotating camera pan bearing includes at least one pan bearing vent slot that aligns with the base vent slots during rotation.

12. The method as claimed in claim 11, further comprising attaching a heat sink and an electronics board to the rotating camera pan bearing, wherein the heat sink and electronics board are positioned adjacent to the at least one pan bearing vent slot.

13. The method as claimed in claim 11, wherein alignment of the at least one pan bearing vent slot with the base vent slots ensures air flow is directed over a heat sink and an electronics board.

14. The method as claimed in claim 11, further comprising providing a camera on the rotating camera pan bearing.

15. The method as claimed in claim 14, wherein the camera is a pan, tilt, zoom (PTZ) camera.

16. The method as claimed in claim 11, further comprising moving air through the at least one pan bearing vent slot and base vent slots with a fan.

17. The method of claim 16, wherein the fan is installed within a fan housing that is attached to the camera base, the fan housing protecting the fan and enable the fan to exhaust the air out fan vents slots of the fan housing.

18. The method as claimed in claim 11, wherein the base vent slots are spaced around the perimeter such that the at least one pan bearing vent slot is always at least partially aligned with at least one of the base vent slots to maintain air flow within the camera system.

19. The method as claimed in claim 11, wherein the rotating camera pan bearing is rotated via a motor, which is cooled from air moving through the at least one pan bearing vent slot and the base vent slots.

20. The method as claimed in claim 11, wherein the base vent slots that are not aligned with the at least one pan bearing vent slot prevent air from moving between the camera base and a camera housing.

* * * * *